(12) United States Patent
Schaeffer

(10) Patent No.: US 7,392,108 B2
(45) Date of Patent: Jun. 24, 2008

(54) METHOD OF CONTROLLING AN EDGER DEVICE, MACHINE PROGRAMMED TO EDGE AN OPHTHALMIC LENS BLANK, AND COMPUTER PROGRAM

(75) Inventor: Kurt William Schaeffer, Waynesboro, VA (US)

(73) Assignee: National Optronics, Inc., Charlottesville, VA (US)

( * ) Notice: Subject to any disclaimer, the term of this patent is extended or adjusted under 35 U.S.C. 154(b) by 0 days.

(21) Appl. No.: 11/511,434

(22) Filed: Aug. 29, 2006

(65) Prior Publication Data

US 2008/0058983 A1 Mar. 6, 2008

(51) Int. Cl.
*G06F 19/00* (2006.01)
(52) U.S. Cl. .......................... 700/164; 700/159; 451/5; 451/42; 451/43
(58) Field of Classification Search ............... 700/160, 700/164, 172, 186, 159; 351/159, 177; 451/5, 451/42–44, 240
See application file for complete search history.

(56) References Cited

U.S. PATENT DOCUMENTS

| | | | | |
|---|---|---|---|---|
| 5,257,198 A | * | 10/1993 | van Schoyck | 700/160 |
| 5,329,735 A | * | 7/1994 | Charlton et al. | 451/41 |
| 5,410,843 A | * | 5/1995 | Gottschald | 451/43 |
| 5,711,700 A | * | 1/1998 | Raffaelli | 451/43 |
| 6,203,409 B1 | * | 3/2001 | Kennedy et al. | 451/43 |
| 6,220,927 B1 | * | 4/2001 | Mizuno et al. | 451/5 |
| 6,547,642 B2 | * | 4/2003 | Hatano | 451/11 |
| 6,758,733 B2 | * | 7/2004 | Wiand | 451/461 |
| 6,942,542 B2 | * | 9/2005 | Shibata | 451/5 |

* cited by examiner

*Primary Examiner*—Alexander J Kosowski
(74) *Attorney, Agent, or Firm*—Berenato, White & Stavish

(57) ABSTRACT

The present invention relates to a method of controlling an ophthalmic edger device, and a machine programmed to edge and ophthalmic lens blank. A lens blank and an edger device for forming a groove in a peripheral edge of the lens blank are provided. A central processing unit is provided, which is operably associated with the edger device for controlling operation of the edger device. Processing instructions are transmitted from the central processing unit to the edger device, wherein the processing instructions comprise forming a groove in a peripheral edge of a lens blank, and removing lens material debris from the formed groove.

18 Claims, 5 Drawing Sheets

METHOD OF CONTROLLING AN EDGER DEVICE, MACHINE PROGRAMMED TO EDGE AN OPHTHALMIC LENS BLANK, AND COMPUTER PROGRAM

COMPUTER PROGRAM LISTING APPENDIX

A computer program listing appendix is submitted herewith on compact disc recordable (CD-R) as Appendix A, and the material thereon is incorporated herein by reference. Duplicate copies of Appendix A are provided as Copy 1 and Copy 2. Copy 1 and Copy 2 are identical.

The file contained on Copies 1 and 2 is as follows:

| File Name: | Size in Bytes: | Date of File Creation: |
|---|---|---|
| calc.c | 6,944 | 19 Aug. 2005 |

FIELD OF THE INVENTION

The present invention relates to a method of controlling an ophthalmic edger device, and a machine programmed to edge an ophthalmic lens blank. A lens blank and an edger device for forming a groove in a peripheral edge of the lens blank are provided. A central processing unit is provided, which is operably associated with the edger device for controlling operation of the edger device. Processing instructions are transmitted from the central processing unit to the edger device, wherein the processing instructions comprise forming a groove in a peripheral edge of a lens blank, and removing lens material debris from the formed groove.

BACKGROUND OF THE INVENTION

Prescription eyeglass lenses are curved in such a way that light is correctly focused onto the retina of a patient's eye, improving vision. Such lenses are formed from glass or plastic lens "blanks" having certain desired properties to provide the correct prescription for the patient. The blanks are usually circular and of substantially larger dimension, for example 70 mm in diameter, compared to the relatively smaller finished lenses assembled into eyeglass frames. Therefore, a lens blank must be edged to fit an eyeglass frame selected by the patient.

Ophthalmic laboratory technicians cut, grind, edge, and polish blanks according to prescriptions provided by dispensing opticians, optometrists, or ophthalmologists. The specifications include the patient's full prescription, including: 1) the total power the finished lens must have; 2) the strength and size of any segments, if needed (i.e. multifocal lenses); 3) the power and orientation of any cylinder curves; and 4) the location of the optical center and any inducted prism that may be needed. The optical center is the spot on the eyeglass lens where light passes through without refracting, and is normally placed in front of the patient's pupil.

In addition, the large diameter blank is sized and shaped to fit into the frame selected by the patient. The lens blank may be shaped using an edger, such as the edger disclosed in U.S. Pat. No. 6,203,409 to Kennedy et al., the disclosure of which is incorporated herein by reference. The blank is edged so that the periphery of the finished lenses fit into the openings on the frames.

Edging of a lens blank typically requires the application of a block to a surface thereof. The block is releasably secured to a clamp assembly, so that rotation of the clamp assembly causes corresponding rotation of the lens blank. As the blank is rotated, the periphery of the blank may be cut to a desired size using a router tool. The lens periphery may also be polished using a polishing tool. A bevel or groove is often formed about the lens.

The finished lens may then be assembled with the selected eyeglass frames. The frames include two spaced openings in which the finished lenses are mounted. Many frames have a bevel extending around the inner circumference of the openings. The bevel interlocks with a complementarily shaped groove formed about the peripheral edge of the lens. The interlock between the complementary bevel and groove helps to secure the lens within the opening.

Information relating to the size and shape of the lens needed for a particular frame (i.e. trace data) may be generated, and subsequently transmitted to the edger. Such trace data may be generated by a tracer machine, which includes a clamp assembly for clamping the frames in place, and an engager having a projecting surface for tracing the groove of the frames. Trace data is thereby generated according to the position of the engager. The trace data may be stored in a control system, such as a central processing unit, in communication with the edger.

The edger processes the edge of the lens blank to create an edge profile according to the trace data. A router tool on the edger forms the groove about the lens. The router tool may include a grooving wheel for forming the groove. During the edging and grooving process, lens material debris is generated and often remains in the groove being formed. This debris, or "lens trash", must be manually removed by the lab technician after the edging process, thereby increasing manufacturing time and cost.

SUMMARY OF THE INVENTION

Conventional edging processes require that the lab technician manually remove any lens material debris from the formed groove after the edging process. The disclosed invention eliminates the need for this extra step, thereby improving manufacturing efficiency. This enhanced functionality provides for a finished, clean lens to be produced by the edger, with no cleaning step required thereafter.

A method of controlling an edger device is disclosed. A lens blank and an edger device for forming a groove in a peripheral edge of the lens blank are provided. A central processing unit is provided, which is operably associated with the edger device for controlling operation of the edger device. Processing instructions are transmitted from the central processing unit to the edger device, wherein the processing instructions comprise forming a groove in a peripheral edge of a lens blank, and removing lens material debris from the formed groove.

A machine programmed to edge a lens blank is also disclosed. The machine includes an edger device for forming a groove in the peripheral edge of a lens blank, a central processing unit operably associated with the edger device for controlling operation thereof, and a computer program stored on a medium in communication with the central processing unit. The computer program comprises a first instruction set operably causing the edger device to form a groove in a peripheral edge of a lens blank, and a second instruction set operably causing the edger device to remove lens material debris from the formed groove.

The present invention is also directed to a computer program stored on a medium for use in an edging process employing a lens blank and an edger device having a router tool. The computer program comprises a first set of computer instructions operably recalling trace data about the lens blank to be edged, a second set of computer instructions operably causing the router tool to form a groove in a peripheral edge of the lens blank defined by and relative to the trace data, and a third set of computer instructions operably causing the router tool to remove lens material debris from the formed groove.

DETAILED DESCRIPTION OF THE INVENTION

Figure 1:
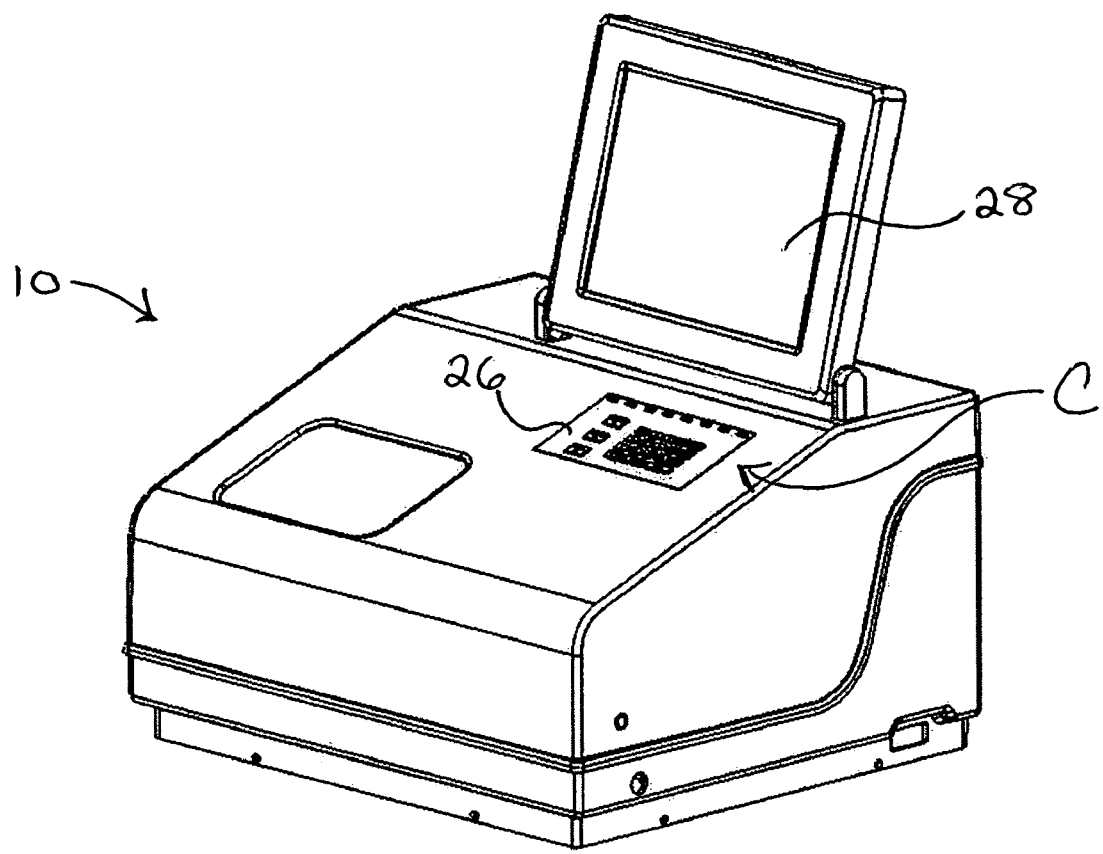
FIG. 1 is a perspective view of an edger device for use in an edging process according to the present invention.
Figure 2:
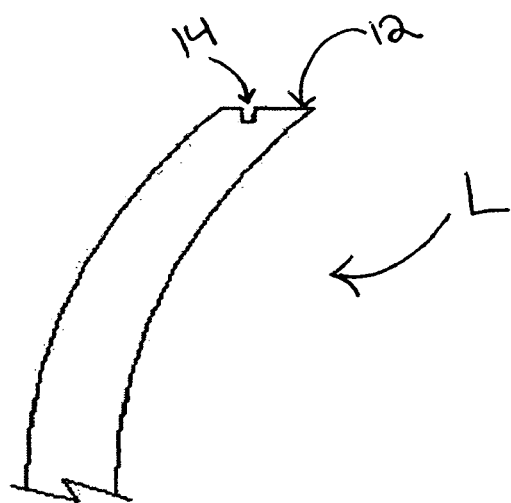
FIG. 2 is a fragmentary sectional view of an ophthalmic lens blank.

The present invention is directed to a machine programmed to edge a lens blank L, as best shown in FIGS. 1 and 2, and a method of controlling the machine. As known in the art, a lens blank L may be ground to fit a particular eyeglass frame. As best shown in FIGS. 1 and 2, the machine may be an edger device 10, which grinds a peripheral edge 12 of lens blank L to a desired size and shape, and forms a groove 14 in edge 12 of lens blank L. Suitable edger devices for the disclosed edging processes are available from National Optronics of Charlottesville, Va., such as the 7E Patternless Edger Machine.

Figure 3:
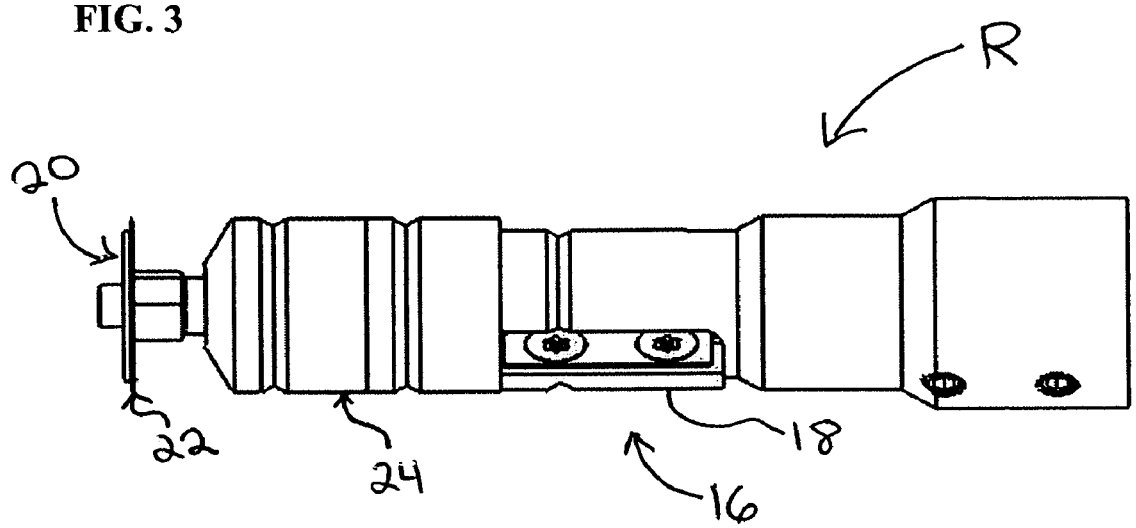
FIG. 3 is an elevational view of a router tool for use in an edging process according to the present invention.
Figure 5:
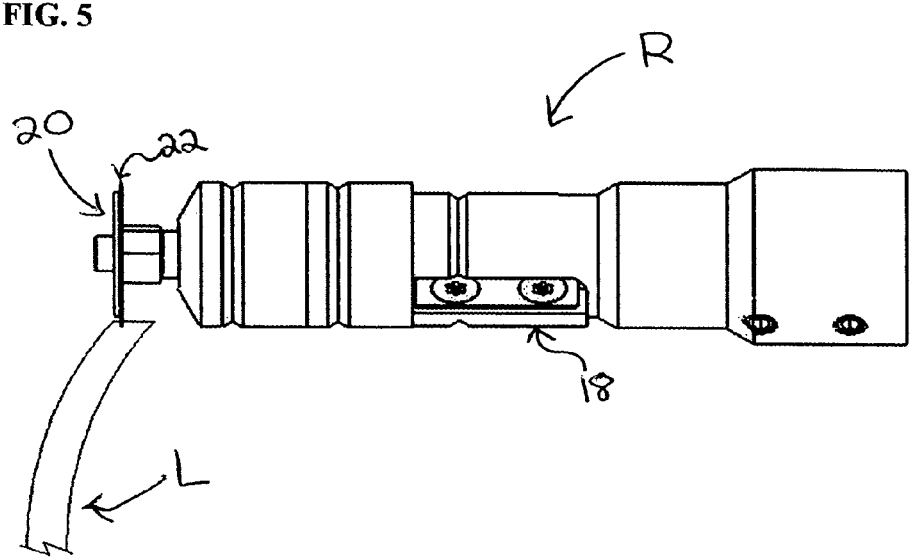
FIG. 5 is an elevational view of the router tool of FIG. 3 and a fragmentary sectional view of a lens blank being grooved.
Figure 7:
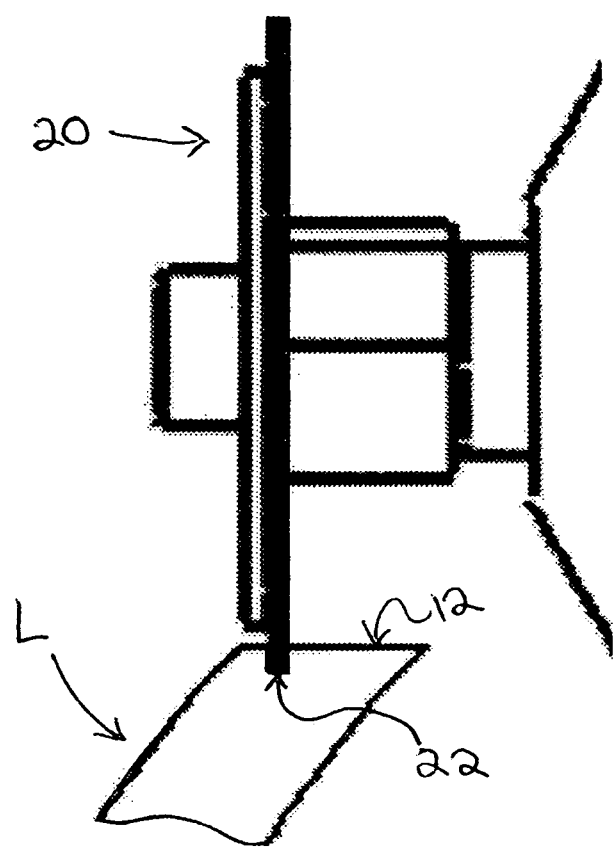
FIG. 7 is an enlarged elevational view of a grooving wheel and a fragmentary sectional view of a lens blank being grooved.

Preferably, edger device 10 includes a router tool R for grinding lens blank L, as shown in FIG. 3. Router tool R may include an edging blade 16 having a substantially planar cutting portion 18 for grinding lens blank L to a desired size and shape. Router tool R also preferably includes a grooving wheel 20 for forming groove 14 in peripheral edge 12 of lens blank L. Grooving wheel 20 has a circular configuration with a cutting edge 22 engageable with peripheral edge 12 for forming groove 14, as best shown in FIGS. 5 and 7. Thus, router tool R may be used to grind lens blank L to a desired size, and also to form groove 14 about the peripheral edge 12 of lens blank L.

It should be understood that router tool R is only exemplary, and the present invention is not so limited. For example, an edger device having a router tool with a grooving blade may be provided for forming groove 14. Alternatively, an edger device may be provided having a first router tool having either a grooving wheel or grooving blade, and a second router tool having a blade for grinding lens blank L to the desired size and shape.

Router tool R may also include a polishing hub 24 for polishing peripheral edge 12 of lens blank L. Polishing hub 24 removes the microscopic score lines creating the smokey finish, so that the resulting edge of the finished lens has a polished translucent appearance. Polishing hub 24 is generally cylindrical in configuration, and may include throughout the entirety of its lens contacting periphery an abrasive coating bonded thereto for removing any score lines and surface imperfections on lens blank L. A suitable polishing hub is described more fully in U.S. Pat. No. 6,203,409, the disclosure of which is incorporated herein by reference.

A central processing unit, or "CPU", (not shown) is provided, preferably as an internal component of edger device 10. However, the CPU may also be external to edger device 10. The CPU is operably associated with edger device 10 and controls operation thereof. The CPU includes a storage medium. A computer program is stored on the medium and in communication with the CPU. The computer program includes a set of processing instructions for controlling operation of edger device 10. The CPU transmits the processing instructions to edger device 10, thereby controlling the edging process according to specified processing steps.

As shown in FIG. 1, edger device 10 preferably includes a control panel C mounted to an upper portion of edger device 10 and provides access by the technician to various controls, collectively 26. Processing parameters may be input into edger device 10 via controls 26, including the position of groove 14 in peripheral edge 12 and the depth of groove 14 relative to peripheral edge 12.

Controls 26 may be provided as a touch screen including a plurality of touch keys and input fields displayed thereon. Alternatively, a conventional keypad or other input device may be provided. Alternatively, an external input device operably associated with edger device 10 may be provided, such as a tablet or keypad. Edger device 10 may also include a display 28 for displaying input fields, trace data, and other information corresponding to the selected processing parameters. As shown in FIG. 1, display screen 28 is an LCD display screen mounted on an upper portion of edger device 10. However, an external display operably associated with edger device 10 may be provided.

In addition to processing parameters relating to groove 14, other processing parameters may be selected by the technician, such as wet and/or dry polishing, bevel type, drilled hole(s), etc. For example, the touch screen may include an input field for "wet polish" with the technician prompted to an input field in which "yes" or "no" may be selected. With respect to processing parameters for groove 14, an input field may be provided wherein the technician specifies its position about peripheral edge 12, as well as the depth of groove 14. For example, the front to back placement of groove 14 in peripheral edge 12 may be selected by the technician. The depth of groove 14 may be selected, so that groove 14 has a predetermined depth extending continuously about the entire peripheral edge 12 of the finished lens. Groove 14 may be centered on peripheral edge 12, closer to the front of lens blank L, or closer to the back of lens blank L, or any position therebetween. Additionally, the position of groove 14 on peripheral edge 12 may vary depending on its location around lens blank L. For example, groove 14 may be closer to the front of lens blank L at one point, and closer to the back of lens blank L at another point.

Various other selectable processing parameters are described in applicant's co-pending application titled "Method Of Grooving and Drilling an Ophthalmic Lens Blank, Machine Programmed Therefor, and Computer Program", the disclosure of which is incorporated herein by reference. As such, controls 26 may include various input fields in addition to processing parameters for groove 14. Further, such input fields and the selected processing parameters may be displayed on display 28.

Trace data relating to the particular frame and lens blank L to be processed may be manually entered via controls 26. Trace data is input to the CPU to ensure proper formation of groove 14, including the horizontal and vertical coordinates, lens base curve, frame wrap, and other data relating to the optical and geometrical parameters of the finished lens. Trace data typically includes a list of points that define the shape of the lens and matching frame. Such points may be relative to a geometric or optical center of lens blank L. Trace data may also be downloaded to the CPU via an associated serial port, particularly if such data is electronically available from the frame manufacturer. Such data is often available from the frame manufacturer, and may be easily downloaded to the CPU. Trace data may be stored on the associated storage medium and recalled by the CPU when needed. Accordingly, the technician may request particular stored or downloaded trace data via an associated input field with controls 26.

Figure 4:
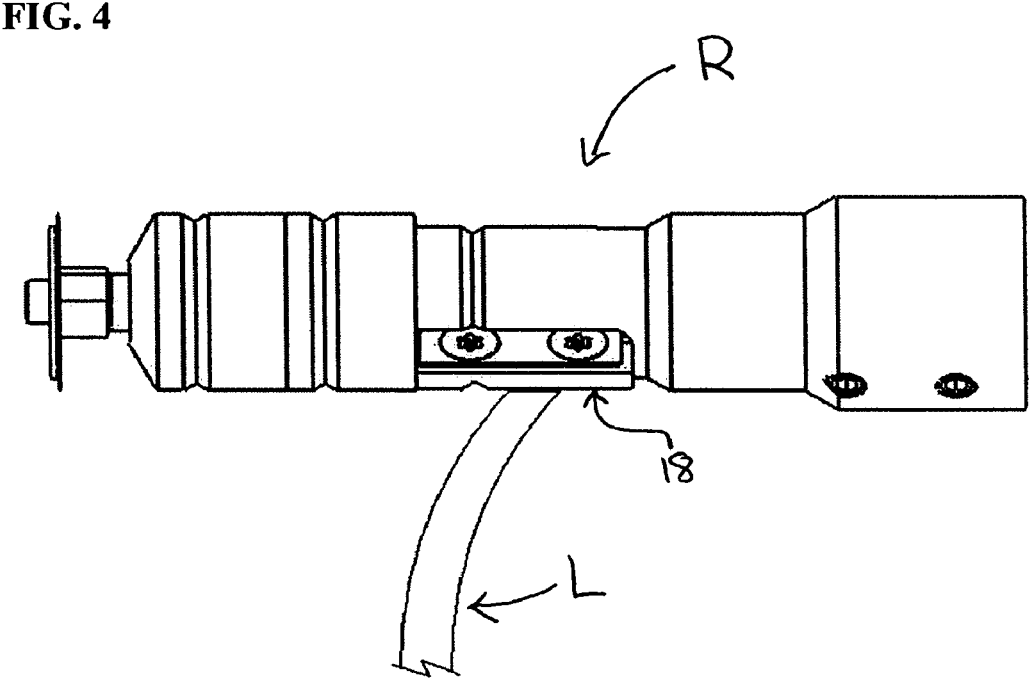
FIG. 4 is an elevational view of the router tool of FIG. 3 and a fragmentary sectional view of a lens blank being edged.
Figure 9:
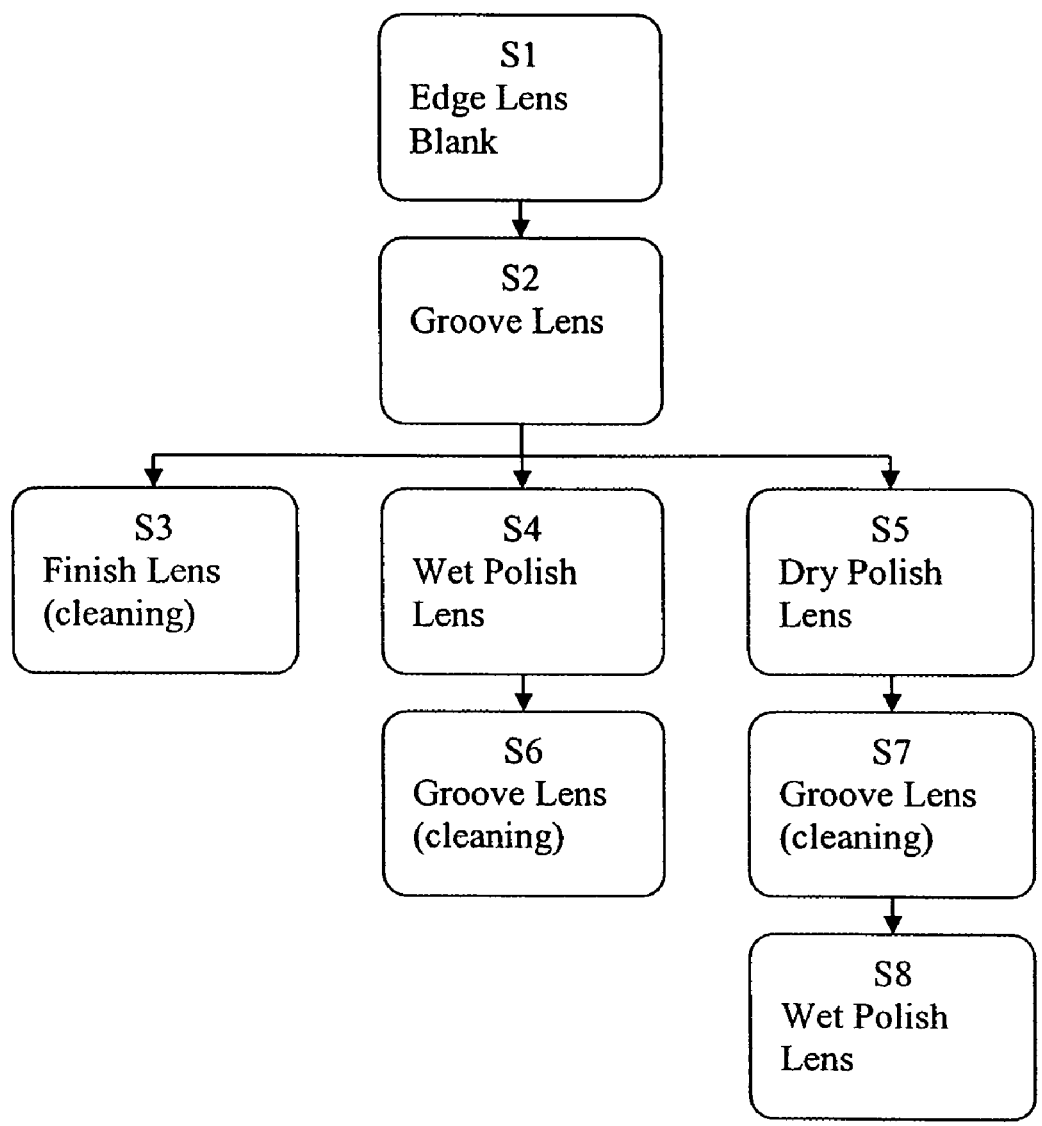
FIG. 9 is a chart showing processing steps for edging processes according to the present invention.

Processing steps for various embodiments of the processing instructions will be described with reference to FIG. 9. According to a first embodiment of processing instructions, a first instruction set initiates the edging process at step S1. The first instruction set causes edger device 10 to grind peripheral edge 12 of lens blank L to a desired size and shape using planar cutting portion 18, as shown in FIG. 4. The desired size and shape of the finished lens is known from the trace data, which may be recalled by the CPU from the associated storage medium. Thus, the CPU controls the edging process at step S 1 based on recalled trace data.

Referring again to FIG. 9, a second instruction set causes edger device 10 to form groove 14 at a predetermined position and to a predetermined depth in peripheral edge 12 of lens blank L at step S2. As shown in FIGS. 5 and 7, cutting edge 22 of grooving wheel 20 contacts peripheral edge 12 of lens blank L, thereby cutting groove 14 into lens blank L. The depth of groove 14 is typically consistent around the entire peripheral edge 12, and may be set by a configuration or set-up value on edger device 10. Groove 14 is formed in the predetermined position, which is defined by and relative to the shape of the edged lens blank L. The shape of lens blank L is known from the trace data. Thus, groove 14 is formed at the predetermined position in peripheral edge 12 based upon the selected or downloaded parameters input into the CPU via either the associated serial port or via controls 26, in light of the recalled trace data.

Figure 6:
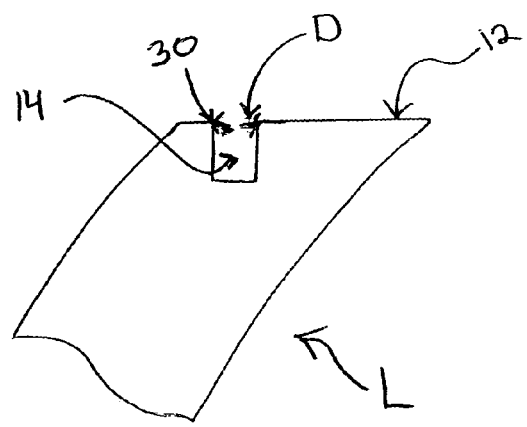
FIG. 6 is a fragmentary sectional view of a grooved lens blank with lens material debris disposed proximate an upper portion of the groove.

The formation of groove 14 often results in lens material debris D collecting in or around groove 14, as best shown in FIG. 6. As cutting edge 22 of grooving wheel 20 cuts into peripheral edge 12, the lens material tends to shear and overlap into groove 14 proximate an upper portion 30 thereof, particularly near the interface between peripheral edge 12 and groove 14. In order to remove any lens material debris D which may have accumulated proximate upper portion 30, the CPU transmits a third instruction set which causes planar cutting portion 18 to re-engage peripheral edge 12 at step S3. Similar to the first instruction set, the third instruction set causes edger device 10 to re-engage peripheral edge 12 of lens blank L using planar cutting portion 18, as shown in FIG. 4. Any debris D which may have sheared and/or splayed into or around upper portion 30 of groove 14 is removed as planar cutting portion 18 contacts peripheral edge 12 during a 'clean finish' process of step S3.

Additional edging of peripheral edge 12 may occur during the clean finish process of step S3 given the edging blade 16 contacts peripheral edge 12. Planar cutting portion 18 removes a sufficient amount of lens material to remove any lens material debris D overhanging groove 14. As such, the resulting lens may be edged to a slightly smaller size compared to its initial edged size after step S1 during clean finish step S3. Therefore, lens blank L may be ground to a first size during the initial edging process at step S1 that is slightly larger than the desired size of the finished lens. Lens blank L may then be ground to a second size slightly smaller than the first size, which is the desired size of the finished lens. The initial edging process at step S1 preferably accounts for the removal of additional lens material in subsequent processing steps, so that the resulting finished lens will be properly sized and shaped.

Thus, planar cutting portion 18 re-engages peripheral edge 12 as it proceeds around lens blank L. Any lens material debris D that may have accumulated in or around groove 14 is thereby removed. The resulting lens is edged and grooved, and any debris in or around groove 14 removed during the clean finish process at step S3 in a single control step, thereby eliminating the need for manually cleaning groove 14 after the finished lens is removed from edger device 10.

Figure 8:
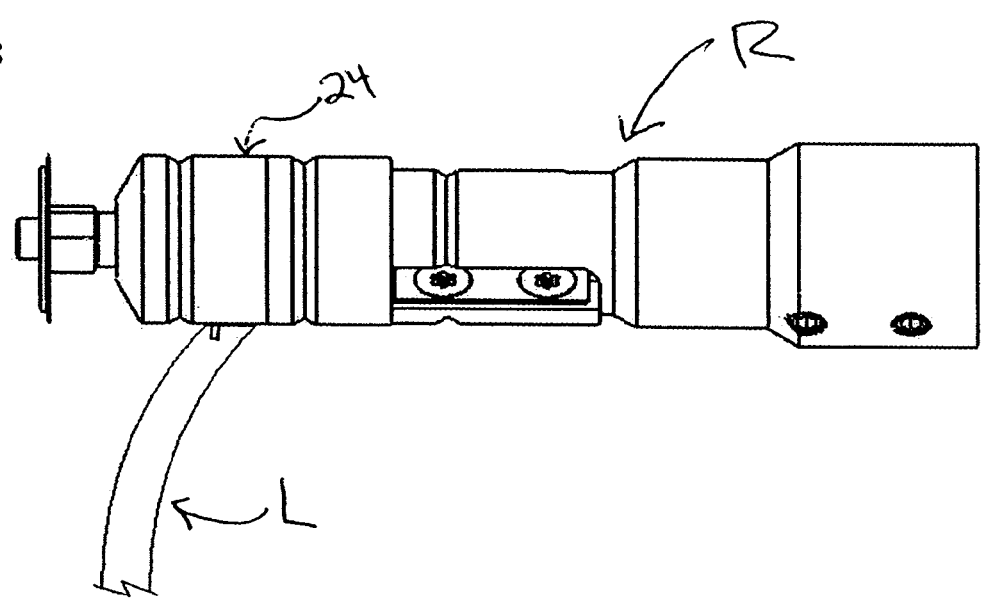
FIG. 8 is an elevational view of the router tool of FIG. 3 and a fragmentary sectional view of a lens blank being polished.

A second embodiment of processing instructions includes the first instruction set of step S1 for initiating the edging process, and the second instruction set of step S2 for causing edger device 10 to form groove 14, as described above. However, processing instructions according to the second embodiment include an instruction set that causes edger device 10 to wet polish lens blank L at step S4 after forming groove 14 at step S2. As such, an edger device 10 used for the process of the second embodiment includes wet polish capabilities. As known in the art, a coolant is typically sprayed onto a polishing hub and lens blank L during the wet polish edging process in order to reduce heat. The wet polish instruction set at step S4 causes edger device 10 to polish peripheral edge 12 of lens blank L using polishing hub 24, as shown in FIG. 8.

Figure 6A:
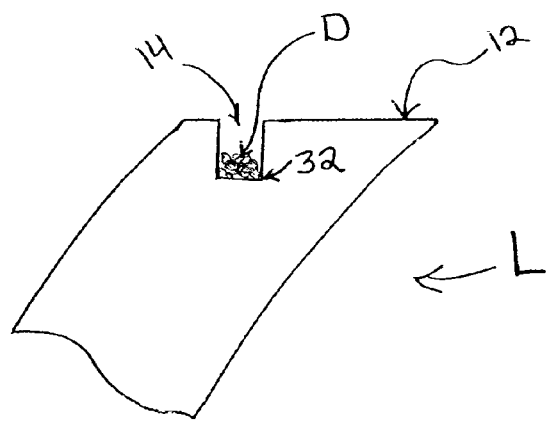
FIG. 6A is a fragmentary sectional view of a grooved and polished lens blank with lens material debris disposed proximate a base of the groove.

Polishing hub 24 removes any surface imperfections on lens blank L, as noted above. In addition, lens blank L is ground to a slightly smaller size during polishing due to the abrasive coating on polishing hub 24, thereby removing any lens material debris D disposed proximate upper portion 30 of groove 14 as shown in FIG. 6. However, the abrasive coating of polishing hub 24 tends to create relatively fine particles of lens material debris D during polishing step S4, thereby smoothing peripheral edge 12. Such particles of lens material debris D may collect within groove 14 proximate a base 32 thereof, as best shown in FIG. 6A.

In order to remove any lens material debris D from groove 14 that may have accumulated following wet polish step S4, the CPU transmits a fourth instruction set which causes grooving wheel 20 to re-engage the already formed groove 14 at step S6. Grooving wheel 20 is positioned within groove 14 so that cutting edge 22 contacts or is directly adjacent the base of formed groove 14, as shown in FIG. 7. Thus, grooving wheel 20 is positioned within groove 14 so that cutting edge 22 is disposed at the predetermined depth thereof. In this way, cutting edge 22 engages base 32 of groove 14. As cutting edge 22 proceeds around lens blank L within groove 14, any debris D that may have accumulated therein during the initial grooving process at step S2 and/or during wet polishing at step S4 is knocked out of groove 14.

Preferably, lens blank L is ground to a first size during the initial edging process at step S1 that is slightly larger than the desired size of the finished lens if polishing hub 24 continues to grind peripheral edge 12 during step S4. As described above for the first embodiment, the initial edging process at step S1 may therefore account for the removal of any additional lens material in subsequent processing steps, so that the resulting finished lens will be properly sized and shaped. In this way, the first size accounts for any additional edging during wet polishing at step S4, thereby ensuring that the finished lens has the desired final size.

A third embodiment of processing instructions includes the first instruction set of step SI for initiating the edging process, and the second instruction set of step S2 for causing edger device 10 to form groove 14. However, processing instructions according to the third embodiment include an instruction set that directs edger device 10 to dry polish lens blank L at step S5 following the grooving process of step S2. Peripheral edge 12 may be dry polished using polishing hub 24, as shown in FIG. 8. However, no coolant is used during the dry polish process.

Any lens material debris D that may have accumulated proximate upper portion 30 is thereby removed during dry polishing at step S5. After lens blank L has been dry polished at step S5, a groove cleaning instruction set causes edger device 10 to remove any debris D that may have accumulated near base 32 of groove 14 using cutting edge 22 of grooving wheel 20 at step S7. Step S7 is identical to the groove cleaning process of step S6 of the second embodiment.

After lens blank L has been edged, grooved, dry polished and cleaned, the CPU may transmit a wet polish instruction set causing edger device 10 to wet polish lens blank L using polishing hub 24 (or another polishing tool operably associated with edger device 10) and coolant at step S8. Step S8 is therefore similar to wet polish step S4 in the second embodiment. However, because lens blank L is already relatively smooth and free of any lens material debris D (due to dry polishing at step S5 and groove cleaning at step S7), minimal or no additional debris D is generated during wet polishing at step S8. In addition, coolant used during wet polishing helps to rinse away any minute particles of lens material that may be generated during the final wet polishing process at step S8. Thus, no further clean finishing steps are typically required after the final wet polishing process in the third embodiment. Of course, it would be readily understood by one skilled in the art that the order of performing the groove cleaning process at step S7 and the wet polishing process at step S8 may be reversed if desired.

Similar to the other embodiments, the process of the third embodiment preferably provides that lens blank L is ground to a first size that is slightly larger than the desired size of the finished lens during the initial edging process at step S1 if the subsequent dry polishing process continues to grind the peripheral edge 12 of lens blank L. The initial edging process at step S1 may therefore account for the removal of any additional lens material in subsequent processing steps, so that the resulting finished lens will be properly sized and shaped. Thus, lens blank L may be ground to a first size during the initial edging process at step S1. Lens blank L may be subsequently ground to a second size slightly smaller than the first size during subsequent processing steps, which is the desired size of the finished lens. In this way, the first size accounts for any additional edging to ensure that the finished lens has the desired final size. Of course, it should be understood that lens blank L may also be ground to its finished size during step SI so long as minimal, or preferably no, additional edging occurs during subsequent processing steps.

The disclosed embodiments are provided by way of example, and the present invention is not so limited. As such, processing steps of a particular embodiment may be modified, eliminated, or combined with other embodiments depending on the particular application. For example, the wet polish instruction set of the second embodiment may be performed after the clean finish step (such as in the third embodiment). A technician may select a particular processing instruction set as desired using controls 26, which communicate the selected processing steps to the CPU.

The present invention is also directed to a computer program stored on a medium for use in an edging process employing a lens blank and an edger device, such as edger device 10. According to a first embodiment, the computer program includes a first set of computer instructions recalling trace data about a particular lens blank L to be processed. A second set of computer instructions causes router tool R to form groove 14 in peripheral edge 12 at a selected position defined by and relative to the trace data. A third set of computer instructions causes router tool R to remove any debris D that may have accumulated from the formed groove 14, as described above.

A computer program according to a second embodiment includes a first set of computer instructions directing edger device 10 to initiate edging, and a second set of computer instructions causing edger device 10 to form groove 14, as described above. A third set of computer instructions then directs edger device 10 to wet polish lens blank L. A fourth set of computer instructions then directs cutting edge 22 of grooving wheel 20 to re-engage groove 14, thereby removing any debris D therefrom.

A computer program according to a third embodiment includes a first set of computer instructions directing edger device 10 to initiate edging, and a second set of computer instructions causing edger device 10 to form groove 14, as described above. A third set of computer instructions then directs edger device 10 to dry polish lens blank L. A fourth set of computer instructions then directs cutting edge 22 of grooving wheel 20 to re-engage groove 14 thereby removing any debris D therefrom. A fifth set of computer instructions then causes edger device 10 to wet polish the finished lens.

An exemplary computer routine for the disclosed computer program is provided in computer program listing Appendix A. However, it would be readily understood that other computer routines may be applied to achieve the disclosed methods for use in an edging process. Thus, it will be apparent to one of ordinary skill in the art that various modifications and variations can be made to the disclosed invention without departing from the spirit of the invention. Further, processing steps from one embodiment may be included in another processing embodiment without departing from the scope of the invention. Therefore, it is intended that the present invention include all such modifications or variations, provided they come within the scope of the following claims and their equivalents.

I claim:

1. A method of controlling an edger device, comprising the steps of:

providing an opthalmic lens blank;

providing an edger device for forming a groove in a peripheral edge of the lens blank;

providing a central processing unit operably associated with the edger device for controlling operation of the edger device; and transmitting processing instructions from the central processing unit to the edger device, wherein the processing instructions comprise:

a) forming a groove in a peripheral edge of a lens blank; and
b) removing lens material debris from the formed groove, wherein said steps of forming a groove and removing lens material debris are transmitted in a single cycle.

2. The method of claim 1, wherein the edger device provided during said step of providing an edger device comprises a planar cutting blade and one of a grooving wheel and a grooving blade.

3. The method of claim 2, wherein the processing instructions include the further steps of:
edging the lens blank to a first size by engaging the peripheral edge of the lens blank with the planar cutting blade prior to said forming step; and
edging the lens blank to a second size smaller than the first size by re-engaging the peripheral edge of the lens blank with the planar cutting blade during said removing step so that debris proximate an upper portion of the formed groove is removed.

4. The method of claim 2, wherein the edger device provided during said step of providing an edger device further comprises a polishing hub.

5. The method of claim 4, wherein the processing instructions include the further steps of:
edging the lens blank to a first size by engaging the peripheral edge of the lens blank with the planar cutting blade prior to said forming step; and
edging the lens blank to a second size smaller than the first size by engaging the peripheral edge of the lens blank with the polishing hub during said removing step so that debris proximate an upper portion of the formed groove is removed.

6. The method of claim 5, wherein the processing instructions include the further steps of:
engaging the peripheral edge of the lens blank with one of the grooving wheel and the grooving blade during said step of forming a groove; and
re-engaging the peripheral edge of the lens blank with one of the grooving wheel and the grooving blade after said step of edging the lens blank to a second size so that debris proximate a base of the formed groove is removed.

7. The method of claim 6, wherein the lens blank is wet polished during said step of edging the lens blank to a second size.

8. The method of claim 6, wherein the lens blank is dry polished during said step of edging the lens blank to a second size.

9. The method of claim 8, wherein the processing instructions include the further step of wet polishing the peripheral edge of the lens blank after said step of re-engaging the peripheral edge with one of the grooving wheel and the grooving blade.

10. A machine programmed to edge a lens blank, comprising:
an edger device for forming a groove in a peripheral edge of an ophthalmic lens blank;
a central processing unit operably associated with the edger device for controlling operation of the edger device; and
a computer program stored on a medium in communication with said central processing unit, said computer program comprising:

a) a first instruction set operably causing said edger device to edge the pereipheral edge of the lens blank to a first size;
b) a second instruction set operably causing said edger device to form a groove in a peripheral edge of a lens blank; and
c) a third instruction set operably causing said edger device to edge the peripheral edge of the lens blank to a second size smaller than the first size after forming the groove, and thereby causing said edger device to remove lens material debris proximate an upper portion of the formed groove.

11. The machine of claim 10, wherein said edger device comprises a planar cutting blade and one of a grooving wheel and a grooving blade.

12. The machine of claim 11, wherein said first instruction set operably causes said edger device to edge the lens blank to the first size by engaging the peripheral edge of the lens blank with the planar cutting blade, and said third instruction set operably causes said edger device to edge the lens blank to the second size by re-engaging the peripheral edge of the lens blank with the planar cutting blade.

13. The machine of claim 11, wherein said edger device further comprises a polishing hub.

14. The machine of claim 13, wherein said first instruction set operably causes said edger device to edge the lens blank to the first size by engaging the peripheral edge of the lens blank with the planar cutting blade, and said third instruction set operably causes said edger device to edge the lens blank to the second size by engaging the peripheral edge of the lens Hank with the polishing hub.

15. The machine of claim 14, wherein said second instruction set operably causes said edger device to form the groove by engaging the peripheral edge of the lens blank with one of the grooving wheel and the grooving blade.

16. The machine of claim 15, wherein said computer program further comprises a fourth instruction set operably causing said edger device to re-engage the formed groove with one of the grooving wheel and the grooving blade, thereby causing said edger device to remove lens material debris from a base of the formed groove.

17. A computer program stored on a medium for use in an edging process employing an ophthalmic lens blank and an edger device having a router tool, the computer program comprising:
a first set of computer instructions operably recalling trace data about the lens blank to be edged;
a second set of computer instructions operably causing the router tool to edge a peripheral edge of the lens blank to a first size;
a third set of computer instructions operably causing the router tool to form a groove in the peripheral edge of the lens blank at a selected position defined by and relative to the trace data;
a fourth set of computer instructions operably causing the router tool to edge the peripheral edge of the lens blank to a second size smaller than the first size after forming the groove, and thereby causing the edger device to remove lens material debris proximate an upper portion of the formed groove.

18. The computer program of claim 17, further comprising a fifth set of computer instructions operably causing the edger device to wet polish the lens blank after forming the groove.

* * * * *